(12) United States Patent
Yu

(10) Patent No.: US 11,157,430 B2
(45) Date of Patent: Oct. 26, 2021

(54) DC-DC POWER CONVERTER WITH FOUR WAY POWER CONVERSION

(71) Applicant: SCHNEIDER ELECTRIC IT CORPORATION, Foxboro, MA (US)

(72) Inventor: Qinghong Yu, Carlisle, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/749,202

(22) Filed: Jan. 22, 2020

(65) Prior Publication Data

US 2021/0191892 A1 Jun. 24, 2021

Related U.S. Application Data

(60) Provisional application No. 62/950,550, filed on Dec. 19, 2019.

(51) Int. Cl.
*G06F 13/374* (2006.01)
*H02J 3/00* (2006.01)
*H02M 7/00* (2006.01)

(52) U.S. Cl.
CPC .......... *G06F 13/374* (2013.01); *H02J 3/0073* (2020.01); *H02M 7/003* (2013.01)

(58) Field of Classification Search
CPC ................................................ H02M 2001/007
See application file for complete search history.

(56) References Cited

U.S. PATENT DOCUMENTS 5,440,179 A * 8/1995 Severinsky ............. H02J 9/062
307/66
6,816,053 B2 * 11/2004 Camwell ............... H01F 13/003
336/181
(Continued)

FOREIGN PATENT DOCUMENTS

CH 708498 A2 3/2015
EP 3382874 A1 10/2018

OTHER PUBLICATIONS

Choi, Hangseok, "Design Considerations for an LLC Resonant Converter," Fairchild Semiconductor, Fairchild Power Seminar 2007, pp. A1-A9.
(Continued)

*Primary Examiner* — Henry Tsai
*Assistant Examiner* — Juanito Borromeo
(74) *Attorney, Agent, or Firm* — Lando & Anastasi, LLP

(57) ABSTRACT

According to one aspect, embodiments of the invention provide a DC-DC power converter system comprising a positive bus interface, a negative bus interface, a positive battery interface, a negative battery interface, a first converter segment coupled to the positive bus interface and the negative bus interface, a transformer coupled to the first converter segment, a second converter segment coupled to the transformer, the positive battery interface, and the negative battery interface, a bus balancer circuit coupled to the transformer, and a controller configured to identify an imbalance between a positive voltage level on a positive DC bus and a negative voltage level on a negative DC bus, and in response to identifying the imbalance, operating the bus balancer circuit to convert the first converter segment, the transformer, and the second converter segment into an inverted buck-boost converter configured to transfer energy (Continued)

between the positive bus interface and the negative bus interface.

20 Claims, 6 Drawing Sheets

(56) References Cited

U.S. PATENT DOCUMENTS

| | | | | |
|---|---|---|---|---|
| 2001/0001535 A1* | 5/2001 | Johnson, Jr. | ............ | H02J 9/061 |
| | | | | 323/282 |
| 2005/0213357 A1* | 9/2005 | Paatero | ................ | H02M 5/458 |
| | | | | 363/95 |

OTHER PUBLICATIONS

Gao, Fei et al., "Duty-cycle plus phase-shift control for a dual active half bridge based bipolar DC microgrid," 2018 IEEE, pp. 1479-1485.

Extended European Search Report from corresponding European Application No. 20213752.7 dated Jun. 10, 2021.

Zhang Jiepin et al: A Modified DC Power Electronic Transformer Based on Series Connection of Full-Bridge Convertersn, IEEE Transactions on Power Electronics, Institute of Electrical and Electronics Engineers, USA, vol. 34, No. 3, Mar. 1, 2019 (Mar. 1, 2019), pp. 2119-2133, XP011708518, ISSN: 0885-8993, DOI: 10.1109/TPEL.2018.2842728 [retrieved on Feb. 5, 2019].

* cited by examiner

DC-DC POWER CONVERTER WITH FOUR WAY POWER CONVERSION

CROSS REFERENCE TO RELATED APPLICATION

This application claims priority to U.S. Provisional Patent Application No. 62/950,550 filed Dec. 19, 2019, entitled DC-DC POWER CONVERTER WITH FOUR WAY POWER CONVERSION, which is incorporated by reference herein in its entirety.

BACKGROUND

1. Field of Invention

The present invention relates generally to Uninterruptible Power Supplies (UPS).

2. Discussion of Related Art

The use of power devices, such as Uninterruptible Power Supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's do not provide conditioning of input AC power, but do provide back-up AC power upon interruption of the primary AC power source. Line interactive UPS's are similar to off-line UPS's in that they switch to battery power when a blackout occurs but also include a multi-tap transformer for regulating the output voltage provided by the UPS.

SUMMARY

At least one aspect of the invention is directed to a DC-DC power converter system Comprising a positive bus interface configured to be coupled to a positive DC bus, a negative bus interface configured to be coupled to a negative DC bus, a positive battery interface configured to be coupled to a positive terminal of a battery, a negative battery interface configured to be coupled to a negative terminal of the battery, a first converter segment coupled to the positive bus interface and the negative bus interface, a transformer coupled to the first converter segment, a second converter segment coupled to the transformer, the positive battery interface, and the negative battery interface, a bus balancer circuit coupled to the transformer, and a controller coupled to the positive bus interface, the negative bus interface, and the bus balancer, the controller configured to identify an imbalance between a positive voltage level on the positive DC bus and a negative voltage level on the negative DC bus, and in response to identifying the imbalance, operating the bus balancer circuit to convert the first converter segment, the transformer, and the second converter segment into an inverted buck-boost converter configured to transfer energy between the positive bus interface and the negative bus interface.

According to one embodiment, the first converter segment is a half-bridge converter. In one embodiment, the first converter segment includes a plurality of switches coupled between the positive bus interface and the negative bus interface and a resonant inductor coupled between the plurality of switches and the transformer. In another embodiment, the transformer includes a first winding coupled to the resonant inductor and a second winding coupled to the second converter segment. In one embodiment, the bus balancer circuit is coupled across the first winding. In another embodiment, the bus balancer circuit includes a TRIAC coupled across the first winding, and wherein in operating the bus balancer circuit to convert the first converter segment, the transformer, and the second converter segment into an inverted buck-boost converter, the controller is further configured to operate the TRIAC to short the first winding.

According to another embodiment, the transformer further includes a center tap located between a first portion of the second winding and a second portion of the second winding, the center tap coupled to the negative battery interface, and wherein the second converter segment includes a first diode coupled between the first portion of the second winding and the positive battery interface, and a second diode coupled between the second portion of the second winding and the positive battery interface.

According to one embodiment, the bus balancer circuit is coupled across the second winding. In one embodiment, the bus balancer circuit includes a plurality of switches coupled across the second winding, and wherein in operating the bus balancer circuit to convert the first converter segment, the transformer, and the second converter segment into an inverted buck-boost converter, the controller is further configured to operate the plurality of switches in the bus balancer circuit to short the second winding. In another embodiment, the second converter segment includes a push-pull converter. In one embodiment, the transformer further includes a center tap located between a first portion of the second winding and a second portion of the second winding, the center tap coupled to the positive battery interface, and wherein the push-pull converter includes a first switch coupled between the first portion of the second winding and the negative battery interface and a second switch coupled between the second portion of the second winding and the negative battery interface.

According to one embodiment, the second converter segment includes a full-bridge converter. In one embodiment, the full-bridge converter includes a plurality of switches coupled to the second winding, the positive battery interface, and the negative battery interface.

Another aspect of the invention is directed to a non-transitory computer-readable medium storing thereon sequences of computer-executable instructions for operating a DC-DC converter system coupled to a positive DC bus and a negative DC bus of a UPS, the DC-DC converter system including a first converter segment coupled to the positive DC bus and the negative DC bus, a transformer coupled to the first converter segment, the sequences of computer-executable instructions including instructions that instruct at least one controller to identify an imbalance in a positive voltage level of the positive DC bus and a negative voltage level of the negative DC bus, in response to identifying the imbalance, configure the first converter segment, the transformer, and the second converter segment as an inverted buck-boost converter; and operate the inverted buck-boost converter to transfer energy between the positive DC bus and the negative DC bus.

According to one embodiment, the first converter segment includes a half-bridge converter having a plurality of switches coupled to the positive DC bus and the negative DC bus and a resonant inductor coupled between the plurality of switches and the transformer, the transformer includes a first winding coupled to the resonant inductor and a second winding coupled to the second converter segment, and the instructions further instruct the at least one controller to configure the first converter segment, the transformer, and the second converter segment as the inverted buck-boost converter by operating the first converter segment and the second converter segment to short one of the first winding and the second winding of the transformer.

According to another embodiment, the instructions further instruct the at least one controller to short the one of the first winding and the second winding of the transformer by operating a bus balancer circuit to short the first winding. In one embodiment, the instructions further instruct the at least one controller to operate the bus balancer circuit by operating a TRIAC to short the first winding. In another embodiment, the second converter segment includes one of a push-pull converter and a full-bridge converter, and the instructions further instruct the at least one controller to short the one of the first winding and the second winding by operating a bus balancer circuit to short the second winding. In one embodiment, the instructions further instruct the at least one controller to operate the bus balancer circuit by operating a plurality of switches to short the second winding.

At least one aspect of the invention is directed to a DC-DC power converter system comprising a positive bus interface configured to be coupled to a positive DC bus, a negative bus interface configured to be coupled to a negative DC bus, a positive battery interface configured to be coupled to a positive terminal of a battery, a negative battery interface configured to be coupled to a negative terminal of the battery, a first converter segment coupled to the positive bus interface and the negative bus interface, a transformer coupled to the first converter segment, a second converter segment coupled to the transformer, the positive battery interface, and the negative battery interface, and means for configuring the DC-DC power converter and its resonant inductor as an inverted buck-boost converter when a voltage imbalance on the positive bus interface and the negative bus interface is identified and for operating the inverted-buck-boost converter to transfer energy between the positive bus interface and the negative bus interface.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
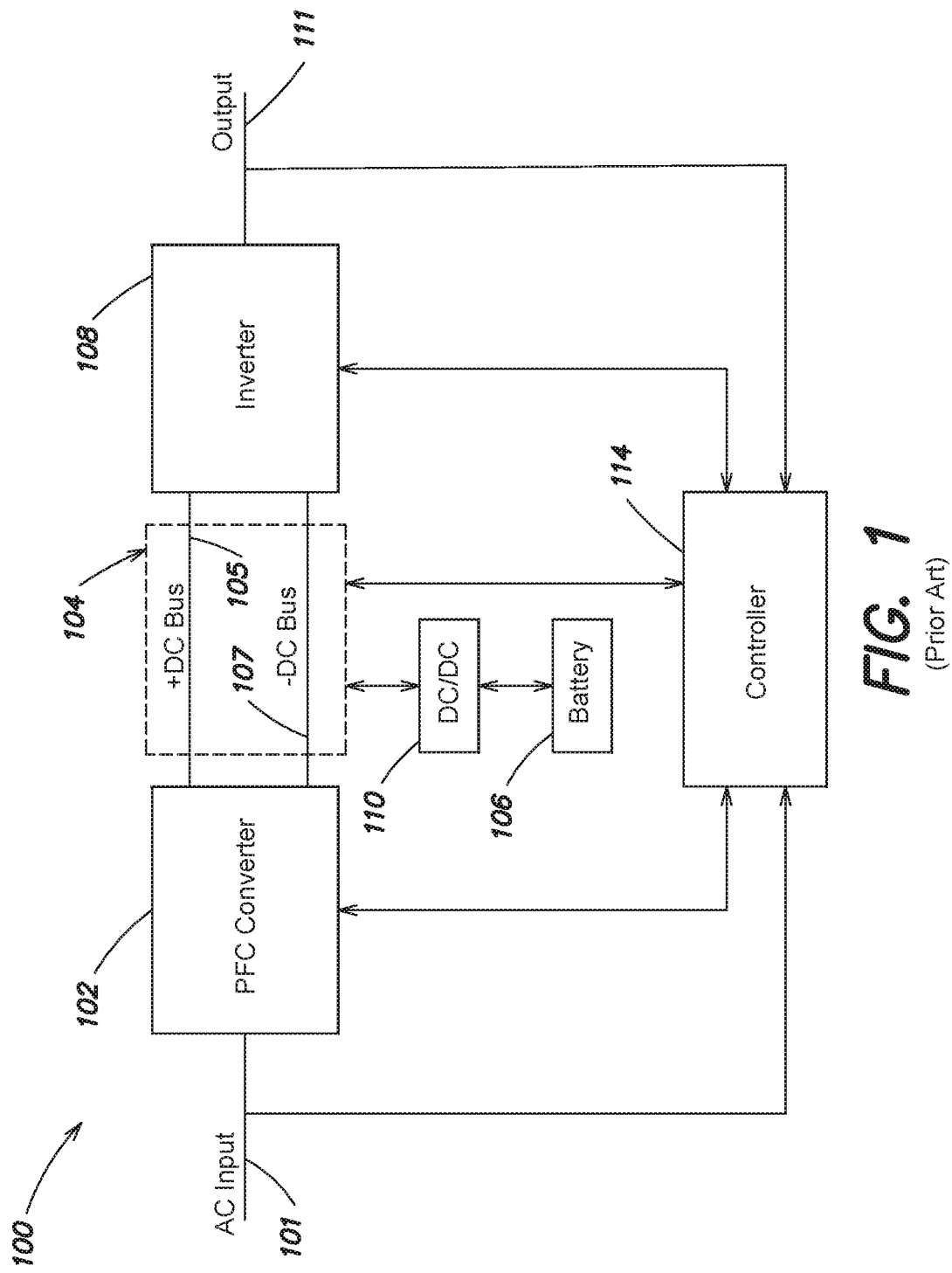
FIG. 1 is a schematic diagram of a traditional online UPS topology according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), are used to provide regulated, uninterrupted power to sensitive and/or critical loads.

A traditional online UPS topology 100 (e.g., shown in FIG. 1) comprises a front-end Power Factor Correction (PFC) circuit 102 that rectifies input AC power provided by an electric utility to an input 101 and feeds DC power to a split DC bus 104 (having a positive DC bus 105 and a negative DC bus 107) in an online mode of operation. The split DC bus 104 is followed by an inverter circuit 108 that generates, in the online mode of operation, an AC output voltage from the DC power on the DC bus 104 and provides the AC output voltage to a load coupled to an output 111. In the absence of mains power, the UPS 100 is operated in a battery (i.e., backup) mode of operation where the front-end PFC circuit 102 is turned off by the controller 114 and the split DC bus 104 is fed by a conventional DC-DC power converter 110 drawing power from a battery 106. In the online mode of operation, the DC power on the split DC Bus 104 is also used to charge the battery 106 via the DC-DC power converter 110.

Conventional DC-DC power converters, for example, such as the converter 110 shown in FIG. 1, have a relatively high component count, cost, and overall system size. In addition, such DC-DC power converters are limited in that they do not provide for the ability to independently control the split DC bus 104 voltage levels. For example, in the battery mode of operation where DC power is supplied from the battery 106 to the split DC bus 104, the same amount of power is injected into each individual DC bus 105, 107 in each switching cycle of the DC-DC power converter 110. Hence individual DC bus voltage levels cannot be controlled based on load demand and a DC bus voltage imbalance may result during unique load conditions (e.g., due to a half-wave rectifier load or a load providing a transient current back to only one of the DC busses 105, 107).

In at least one embodiment, a DC-DC power converter is described herein that can actively correct bus imbalance issues due to an unbalanced load or fault condition. To address bus imbalance issues, the DC-DC power converter can direct power from one DC to bus to another.

Figure 2:
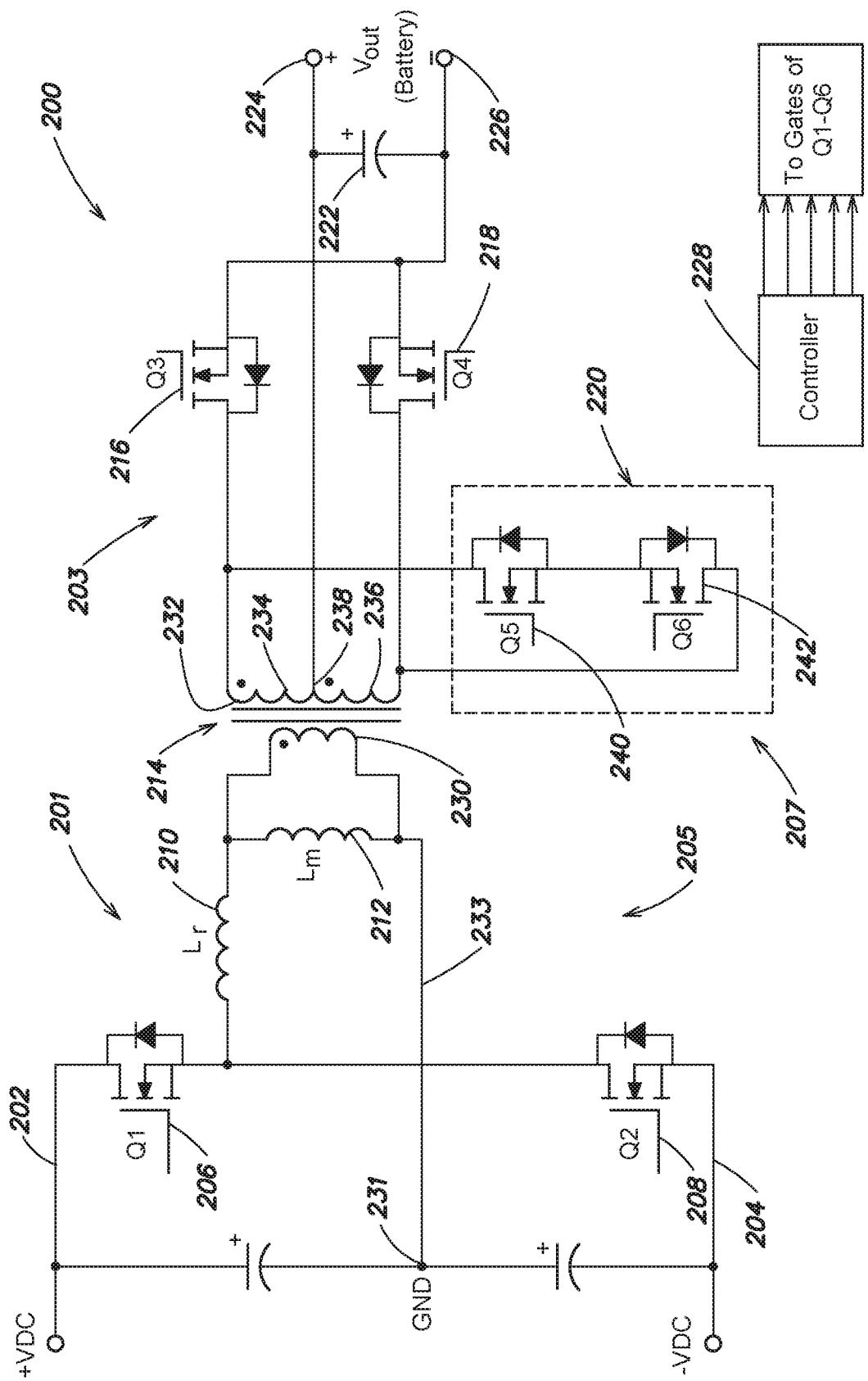
FIG. 2 is a schematic diagram of a DC-DC power converter according to aspects described herein.

FIG. 2 is a schematic diagram of a DC-DC power converter 200 according to at least one aspect described herein. The DC-DC power converter 200 can be used in, for example, a UPS as a replacement for a conventional DC-DC power converter (e.g., the DC-DC power converter 110 in the UPS 100 of FIG. 1). The DC-DC power converter 200 is a dual active bridge converter including a half-bridge converter segment 201 on a DC-bus side 205 and a push-pull converter segment 203 on a battery side 207. More specifically, the DC-DC power converter 200 includes a positive bus interface 202, a negative bus interface 204, a first switch (Q1) 206, a second switch (Q2) 208, a resonant inductor ($L_r$) 210, a transformer 214, a third switch (Q3) 216, a fourth switch (Q4) 218, a bus balance circuit 220, an output capacitor 222, a positive battery interface 224, a negative battery interface 226, and a controller 228. In certain embodiments, the transformer 214 can have a certain amount of leakage inductance and in such an embodiment, this leakage inductance can be included in resonant inductor ($L_r$) 210. According to at least one embodiment, the transformer 214 includes a first winding 230 and a second winding 232. As shown in FIG. 2, in at least one embodiment the second winding 232 includes a first portion 234, a second portion 236, and a center tap 238. According to at least one embodiment, the bus balance circuit 220 includes a fifth switch (Q5) 240 and a sixth switch (Q6) 242. In at least one embodiment, one or more of the switches (Q1-Q6) in the converter 200 is a Field-Effect Transistor (FET); however, in other embodiments, other appropriate switches/transistors can be utilized.

The positive bus interface 202 is configured to be coupled to a positive bus of a power system (e.g., the positive bus 105 of a UPS such as the UPS 100 shown in FIG. 1). The negative bus interface 204 is configured to be coupled to a negative bus of a power system (e.g., the negative bus 107 of a UPS such as the UPS 100 shown in FIG. 1). The drain of the first switch 206 is coupled to the positive bus interface 202. The source of the second switch 208 is coupled to the negative bus interface 204. The drain of the second switch 208 is coupled to the source of the first switch 206. The source of the first switch 206 is also coupled to a first terminal of the resonant inductor ($L_r$) 210. A second terminal of the resonant inductor ($L_r$) 210 is coupled to a first end of the first winding 230 of the transformer 214. A second end of the first winding 230 of the transformer 214 is coupled to ground 231. A magnetizing inductance ($L_m$) 212 of the transformer 214 is represented in FIG. 2 as existing across the first winding 230.

A first end of the second winding 232 is coupled to the drain of the third switch 216. A second end of the second winding 232 is coupled to the drain of the fourth switch 218. The source of the third switch 216 is coupled to the source of the fourth switch 218. The center tap 238 (located between the first portion 234 of the transformer 232 and the second portion 236 of the transformer 232) is coupled to the positive battery interface 224. The source of the fourth switch 218 is also coupled to the negative battery interface 226. The capacitor 222 is coupled between the positive battery interface 224 and the negative battery interface 226. The positive battery interface 224 is configured to be coupled to a positive terminal of a battery. The negative battery interface 226 is configured to be coupled to a negative terminal of the battery.

The bus balance circuit 220 is coupled across the second winding 232 of the transformer 214. For example, in at least one embodiment, the drain of the fifth switch 240 is coupled to the first end of the second winding 232, the source of the fifth switch 240 is coupled to the source of the sixth switch 242, and the drain of the sixth switch 242 is coupled to the second end of the second winding 232. The controller 228 is coupled to the gate of each switch (Q1-Q6) in the converter 200. Operation of the converter 200 is discussed below.

The controller 228 can operate the converter (e.g., by operating the switches Q1-Q6) as a charger (e.g., in the online mode of operation discussed above) to provide regulated DC power, derived from the positive and negative bus interfaces 202, 204, to a battery coupled to the battery interfaces 224, 226 to charge the battery. The controller 228 can also operate the converter 200 (e.g., by operating the switches Q1-Q6) in a battery mode of operation, as discussed above, to provide regulated DC power, derived from a battery coupled to the battery interfaces 224, 226, to the positive and negative bus interfaces 202, 204.

In the online or battery mode of operation, the controller 228 is configured to monitor a voltage level on the positive DC bus (i.e., the voltage level at the positive bus interface 202) and a voltage level on the negative DC bus (i.e., the voltage level at the negative bus interface 204). Based on the monitored voltage levels, the controller 228 is also configured to operate the converter 200 to transfer energy between the positive bus interface 202 (i.e., the positive DC bus) and the negative bus interface 204 (i.e., the negative DC bus) if a voltage imbalance is identified between the positive bus interface 202 (i.e., the positive DC bus) and the negative bus interface 204 (i.e., the negative DC bus).

For example, in the online or battery mode of operation, when the controller 228 identifies that a voltage imbalance between the positive bus interface 202 (and, therefore, the positive DC bus) and the negative bus interface 204 (and, therefore, the negative DC bus) does not exist, the controller operates the fifth switch 240 and the sixth switch 242 to open and operates the first switch 206, the second switch 208, the third switch 216, and the fourth switch 218 with, for example, 50% duty gating signals. During such operation, the converter 200 is capable of providing bidirectional power conversion and the phase relationship between the half-bridge converter segment 201 and the push-pull converter segment 203 determines how the resonant inductor ($L_r$) 210 is charged, as well as the direction and level of power provided by the converter 200 to the bus interfaces 202, 204 or the battery interfaces 224, 226. The first switch 206, the second switch 208, and resonant inductor ($L_r$) are rated to handle the full swing of current at a relatively high frequency for the dual active bridge converter 200. In at least one embodiment, the converter 200 is capable of providing soft switching of the switches Q1-Q4 where switching transitions of the switches Q1-Q4 occur under conditions where the device voltage or current is at, or very close to, zero.

When the controller 228 identifies that a voltage imbalance between the positive bus interface 202 (i.e., the positive DC bus) and the negative bus interface 204 (i.e., the negative DC bus) exists (e.g., due to an unbalanced load, nonlinear load, fault condition, etc.), the controller operates the fifth switch 240 and the sixth switch 242 to close and the third switch 216 and fourth switch 218 to open. During such operation, the second winding 232 of the transformer 214 in the push-pull converter segment 203 is shorted and the half-bridge converter segment 201 becomes an inverted buck-boost converter that is capable of transferring power between the positive bus interface 202 (i.e., the positive DC bus) and the negative bus interface 204 (i.e., the negative DC bus).

Figure 3:
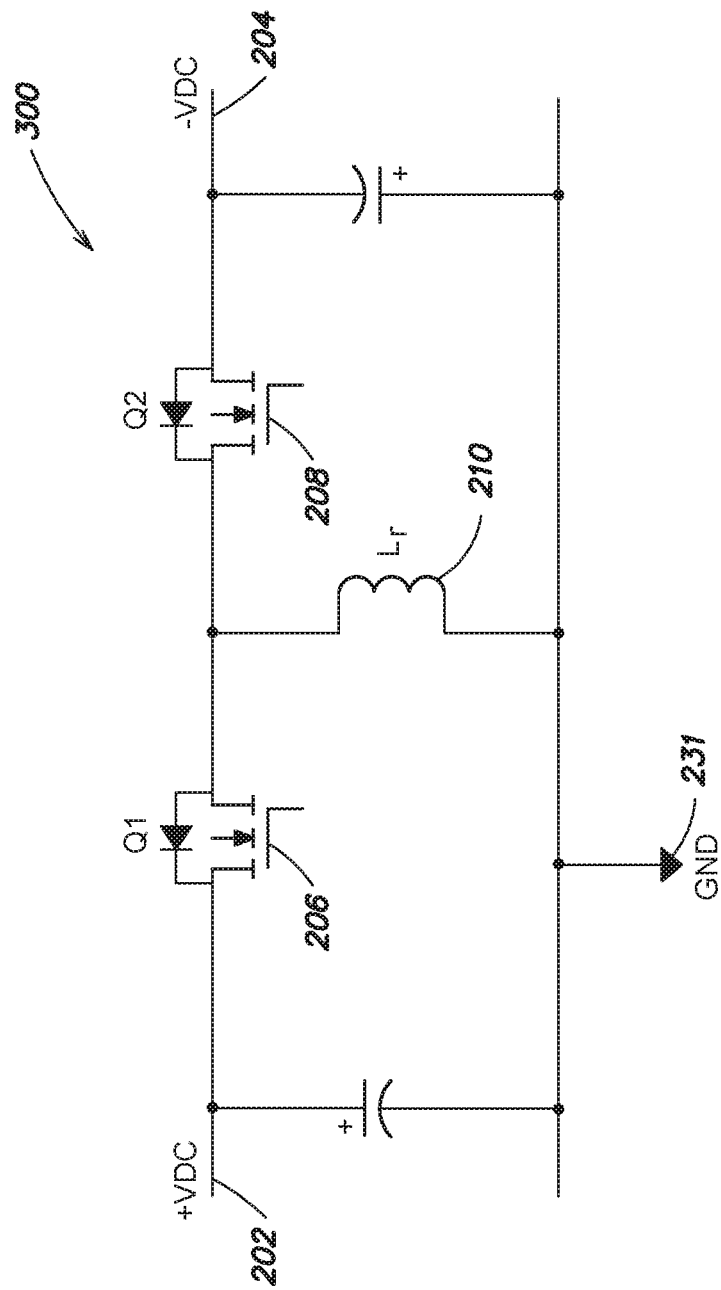
FIG. 3 is a schematic diagram of an inverted buck-boost converter according to aspects described herein.

FIG. 3 is a schematic diagram illustrating the resulting inverted buck-boost converter 300 when the second winding 232 of the transformer 214 in the push-pull converter segment 203 is shorted due to the fifth switch 240 and the sixth switch 242 being closed and the third switch 216 and fourth switch 218 being opened. The magnetizing inductance ($L_m$) 212 of the transformer 214 is coupled in series with the resonant inductor ($L_r$) 210 but is not shown in FIG. 3.

The resulting inverted buck-boost converter 300 is a bidirectional DC-DC converter capable of transferring desired energy between the positive bus interface 202 (i.e., the positive DC bus) and the negative bus interface 204 (i.e., the negative DC bus). The inverted buck-boost converter 300 is capable of providing power conversion between the two DC busses according to the rating of the first switch 206, the second switch 208, and the inductor 210. The controller 228 selectively operates the first switch 206 and the second switch 208 such that the buck-boost converter 300 operates to transfer energy between the positive bus interface 202 (i.e., the positive DC bus) and the negative bus interface 204 (i.e., the negative DC bus) as desired in response to a number of potential scenarios.

For example, the controller 228 can operate the first switch 206 and the second switch 208 to transfer energy between the positive bus interface 202 (i.e., the positive DC bus) and the negative bus interface 204 (i.e., the negative DC bus) to quickly account for an unbalanced load and/or fault condition. The controller 228 can also operate the first switch 206 and the second switch 208 to account for a half-wave rectifying load without generating a DC current in the neutral line 233. Additionally, the controller 228 can operate the first switch 206 and the second switch 208 to transfer energy from one DC bus to the other to increase the hold-up time during a transfer to battery mode. In such a scenario, the size of capacitors coupled to between each DC bus and ground may be reduced.

As discussed above, the DC-DC power converter 200 can actively correct bus imbalance issues in a UPS due to an unbalanced load or fault condition. The DC-DC power converter 200 includes a bus balance circuit 220 that makes it possible for the converter 200 to be turned into an inverted buck-boost converter that is capable of transferring energy from one DC bus to another. As described above, the DC-DC power converter is a dual active bridge converter, which can employ buck-converter-derived topologies on the primary and secondary sides. The embodiment shown in FIG. 2 employs a half-bridge converter segment 201 on the DC-bus side 205 and a push-pull converter segment 203 on the battery side 207; however, in other embodiments, a similar bus balance circuit can be implemented for a different type of converter including a half-bridge converter and a resonant inductor that is purposed for soft switching of the converter in a conventional dual active bridge converter. Regardless of topological differences, the bus balance circuit described above can operate to convert the half bridge and the resonant inductor to an inverted buck boost converter to convert energy from one DC bus to another DC bus.

Figure 4:
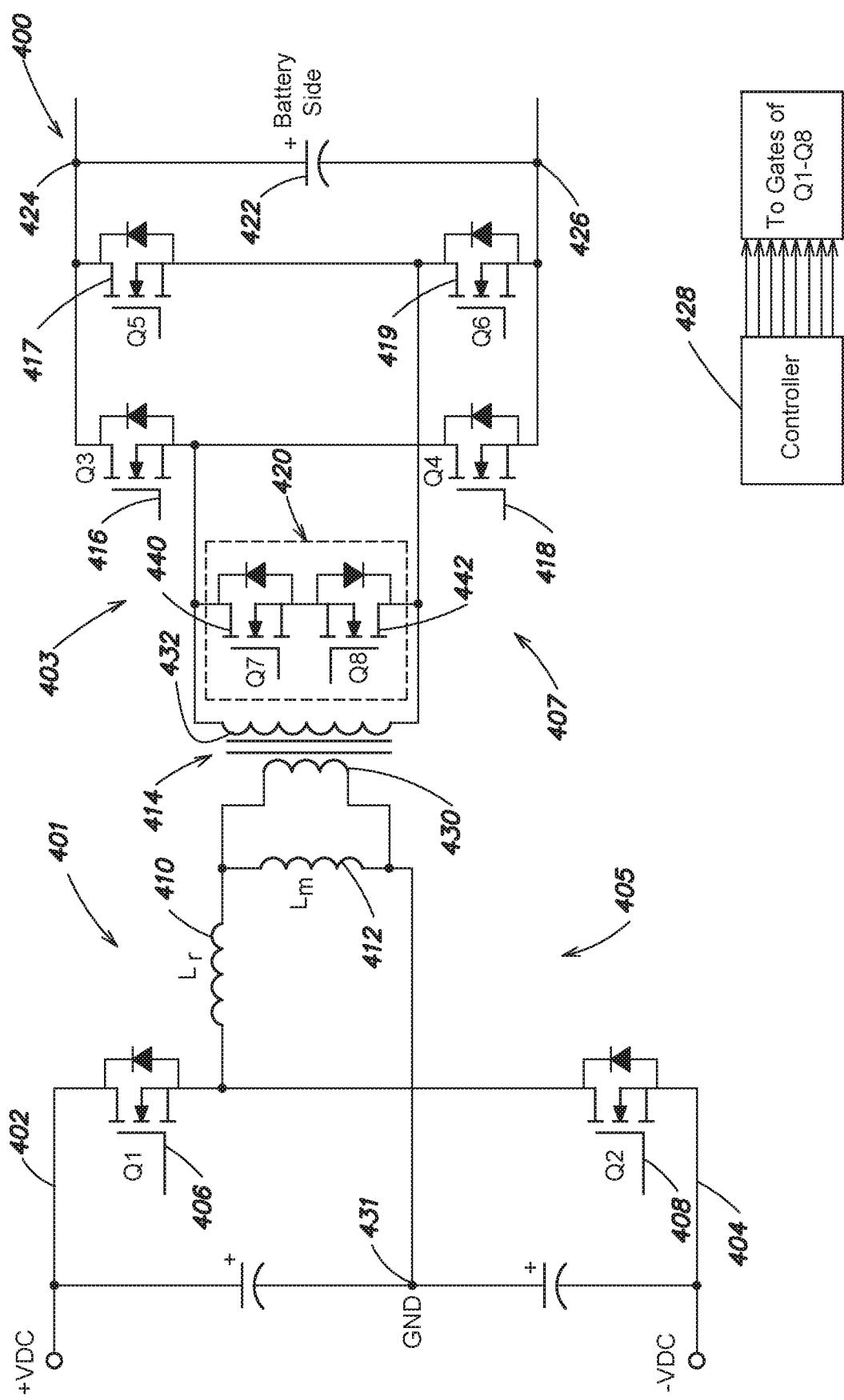
FIG. 4 is a schematic diagram of another embodiment of a DC-DC power converter according to aspects described herein.

FIG. 4 is a schematic diagram of another embodiment of a DC-DC power converter 400 according to at least one aspect described herein. The DC-DC power converter 400 can be used in a UPS and take the place of the converter 200 discussed above with respect to FIG. 2. The DC-DC power converter 400 is a dual active bridge converter including a half-bridge converter segment 401 on a DC-bus side 405 and a full-bridge converter segment 403 on a battery side 407. More specifically, the DC-DC power converter 400 includes a positive bus interface 402, a negative bus interface 404, a first switch (Q1) 406, a second switch (Q2) 408, a resonant inductor ($L_r$) 410, a transformer 414, a third switch (Q3) 416, a fourth switch (Q4) 418, a fifth switch (Q5) 417, a sixth switch (Q6) 419, a bus balance circuit 420, an output capacitor 422, a positive battery interface 424, a negative battery interface 426, and a controller 428. The transformer 414 has a certain amount of leakage inductance and this leakage inductance is included in the resonant inductor ($L_r$) 410. According to at least one embodiment, the transformer 414 includes a first winding 430 and a second winding 432. According to at least one embodiment, the bus balance circuit 420 includes a seventh switch (Q7) 440 and an eighth switch (Q8) 442. In at least one embodiment, one or more of the switches (Q1-Q8) in the converter 400 is a Field-Effect Transistor (FET); however, in other embodiments, other appropriate switches/transistors can be utilized.

The positive bus interface 402 is configured to be coupled to a positive bus of a power system (e.g., the positive bus of a UPS such as the UPS 100 shown in FIG. 1). The negative bus interface 404 is configured to be coupled to a negative bus of a power system (e.g., the negative bus of a UPS such as the UPS 100 shown in FIG. 1). The drain of the first switch 406 is coupled to the positive bus interface 402. The source of the second switch 408 is coupled to the negative bus interface 404. The drain of the second switch 408 is coupled to the source of the first switch 406. The source of the first switch 406 is also coupled to a first terminal of the resonant inductor ($L_r$) 410. A second terminal of the resonant inductor ($L_r$) 410 is coupled to a first end of the first winding 430 of the transformer 414. A second end of the first winding 430 of the transformer 414 is coupled to ground 431. A magnetizing inductance ($L_m$) 412 of the transformer 414 is represented in FIG. 4 as existing across the first winding 430.

A first end of the second winding 432 is coupled to the source of the third switch 416. A second end of the second winding 432 is coupled to the source of the fifth switch 417. The source of the third switch 416 is also coupled to the drain of the fourth switch 418. The source of the fifth switch 417 is coupled to the drain of the sixth switch 419. The drains of the third switch 416 and the fifth switch 417 are coupled to the positive battery interface 424. The sources of the fourth switch 418 and the sixth switch 419 are coupled to the negative battery interface 426. The capacitor 422 is coupled between the positive battery interface 424 and the negative battery interface 426. The positive battery interface 424 is configured to be coupled to a positive terminal of a battery. The negative battery interface 426 is configured to be coupled to a negative terminal of the battery.

The bus balance circuit 420 is coupled across the second winding 432 of the transformer 414. For example, in at least one embodiment, the drain of the seventh switch 440 is coupled to a first end of the second winding 432, the source of the seventh switch 440 is coupled to the source of the eighth switch 442, and the drain of the eighth switch 442 is coupled to a second end of the second winding 432. The controller 428 is coupled to the gate of each switch (Q1-Q8) in the converter 400.

Operation of the converter 400 is similar to the operation of the converter 200 discussed above with respect to FIG. 2. For example, the controller 428 can operate the converter 400 as a charger (e.g., in an online mode of operation) to provide DC power derived from the DC busses to a battery coupled to the bus interfaces 424, 426 and as a backup DC source to provide backup DC power derived from the batter to the DC busses. Further, the controller can operate the bus balancer circuit 420 to short the second winding 432 of the transformer 414 to turn the converter 400 into an inverted buck-boost converter that is capable of transferring energy from one DC bus to another, as described above.

Figure 5:
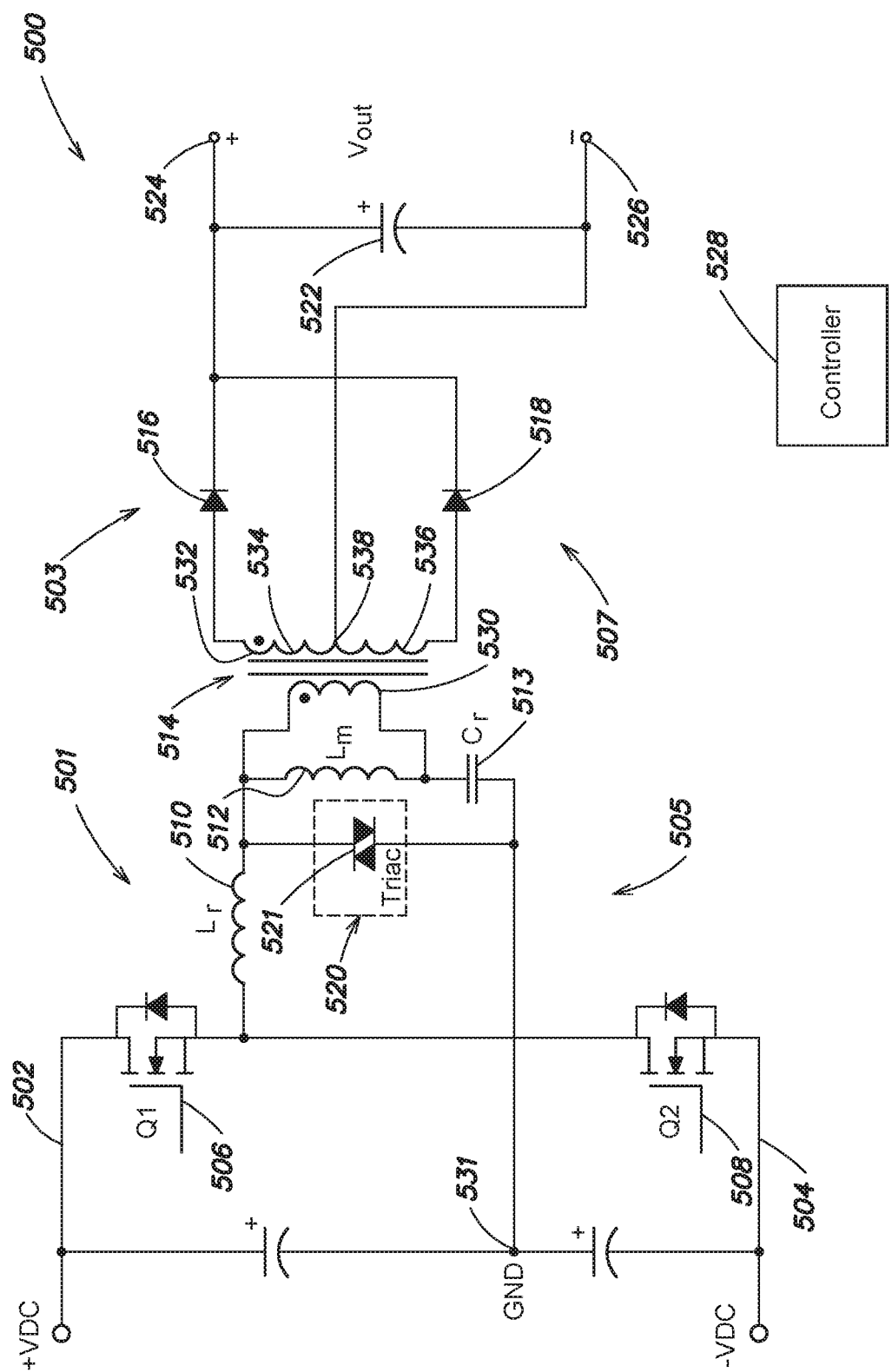
FIG. 5 is a schematic diagram of another embodiment of a DC-DC power converter according to aspects described herein.

As described above, the bus balancer circuit is implemented in a converter to allow for four-way power conversion. However, such a bus balancer circuit can also be utilized in a converter providing three-way power conversion. For example, FIG. 5 is a schematic diagram of another DC-DC power converter 500 according to at least one aspect described herein. The DC-DC power converter 500 can be used in a UPS and take the place of the converter 200 discussed above with respect to FIG. 2. The DC-DC power converter 500 is an LLC based converter including a half-bridge converter segment 501 on a DC-bus side 505 and a second converter segment 503 on a battery side 507. More specifically, the DC-DC power converter 500 includes a positive bus interface 502, a negative bus interface 504, a first switch (Q1) 506, a second switch (Q2) 508, a resonant inductor ($L_r$) 510, a resonant capacitor ($C_r$) 513, a transformer 514, a first diode 516, a second diode 518, a bus balance circuit 520, an output capacitor 522, a positive battery interface 524, a negative battery interface 526, and a controller 528. The transformer 514 has a certain amount of leakage inductance and this leakage inductance is included in the resonant inductor ($L_r$) 510.

According to at least one embodiment, the transformer 514 includes a first winding 530 and a second winding 532. As shown in FIG. 5, in at least one embodiment the second winding 532 includes a first portion 534, a second portion 536, and a center tap 538. According to at least one embodiment, the bus balance circuit 520 includes a Triode for Alternating Current (TRIAC) 521. In at least one embodiment, one or more of the switches (Q1-Q2) in the converter 500 is a Field-Effect Transistor (FET); however, in other embodiments, other appropriate switches/transistors can be utilized.

The positive bus interface 502 is configured to be coupled to a positive bus of a power system (e.g., the positive bus of a UPS such as the UPS 100 shown in FIG. 1). The negative bus interface 504 is configured to be coupled to a negative bus of a power system (e.g., the negative bus of a UPS such as the UPS 100 shown in FIG. 1). The drain of the first switch 506 is coupled to the positive bus interface 502. The source of the second switch 508 is coupled to the negative bus interface 504. The drain of the second switch 508 is coupled to the source of the first switch 506. The source of the first switch 506 is also coupled to a first terminal of the resonant inductor ($L_r$) 510. A second terminal of the resonant inductor ($L_r$) 510 is coupled to a first end of the first winding 530 of the transformer 514. A second end of the first winding 530 of the transformer 514 is coupled to a first terminal of the first capacitor ($C_r$) 513. A second terminal of the first capacitor ($C_r$) 513 is coupled to ground 531 via a neutral line 233. A magnetizing inductance ($L_m$) 512 of the transformer 514 is represented in FIG. 5 as existing across the first winding 530.

A first end of the second winding 532 is coupled to the anode of the first diode 516. The cathode of the first diode 516 is coupled to the positive battery interface 524. A second end of the second winding 532 is coupled to the anode of the second diode 518. The cathode of the second diode 518 is coupled to the positive battery interface 524. The center tap 538 (located between the first portion 534 of the transformer 532 and the second portion 536 of the transformer 532) is coupled to the negative battery interface 526. The output capacitor 522 is coupled between the positive battery interface 524 and the negative battery interface 526. The positive battery interface 524 is configured to be coupled to a positive terminal of a battery. The negative battery interface 526 is configured to be coupled to a negative terminal of the battery.

The bus balance circuit 520 is coupled across the first winding 530 of the transformer 514. For example, in at least one embodiment, a first anode of the TRIAC 521 is coupled to a first end of the first winding 530 of the transformer 514 and a second anode of the TRIAC 521 is coupled to ground 531. The controller 528 is coupled to the gate of each switch (Q1-Q2) in the converter 200 and to the gate of the TRIAC 521.

The controller 528 can operate the converter 500 as a charger (e.g., in an online mode of operation) to provide DC power derived from the DC busses to a battery coupled to the bus interfaces 524, 526. Further, when the controller 528 identifies an imbalance between DC busses in the corresponding UPS, the controller can operate the TRIAC 521 to short the first winding 530 of the transformer 514 and the resonant capacitor 513 to turn the converter 500 into an inverted DC-DC buck-boost converter that is capable of being operated to transfer energy from one DC bus to another, as described above. Once the DC busses are balanced, the controller 528 turns off the TRIAC 521, current through the TRIAC 521 reduces to zero, and the converter 500 again operates as a charger.

Figure 6:
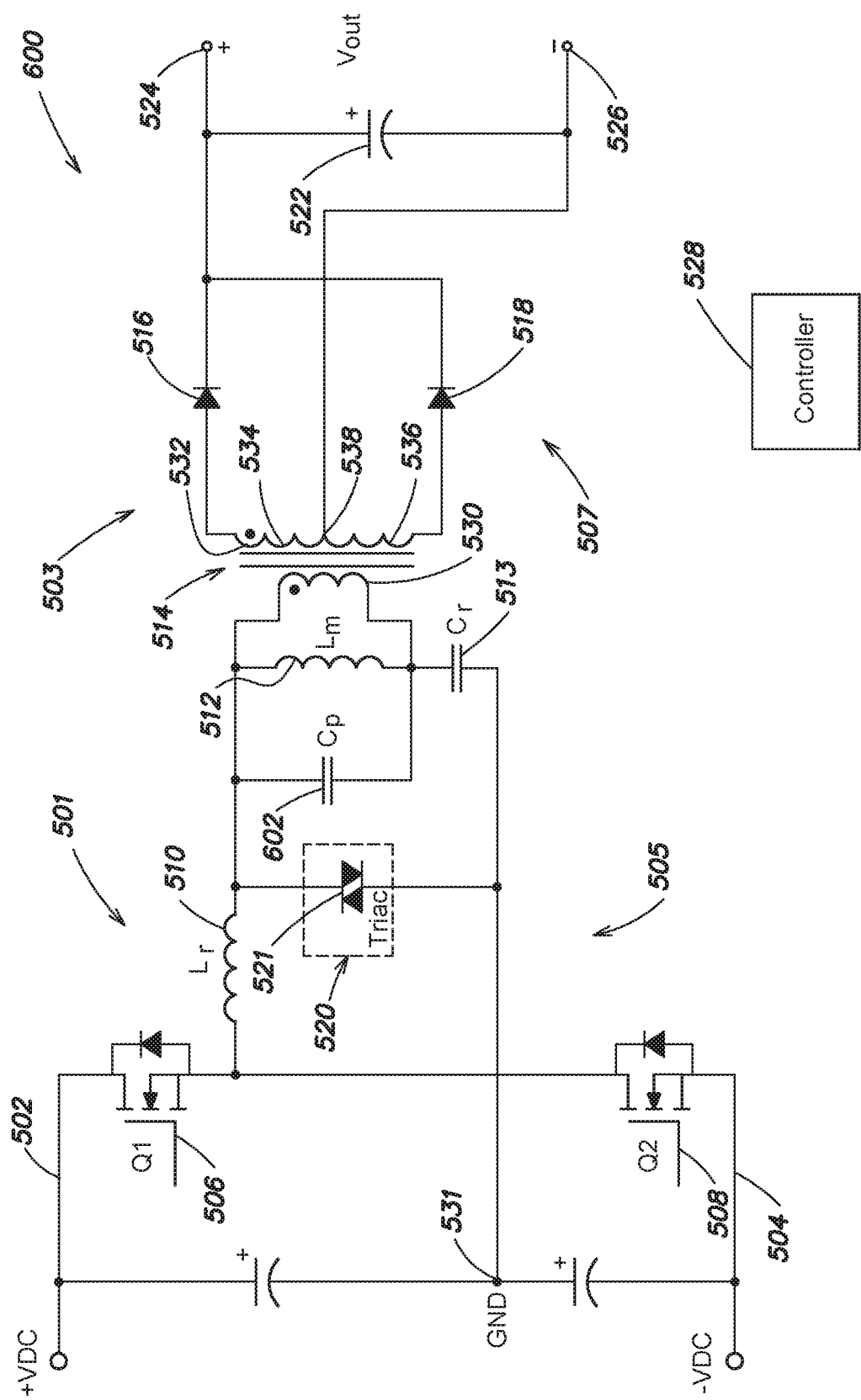
FIG. 6 is a schematic diagram of another embodiment of a DC-DC power converter according to aspects described herein.

According to another embodiment shown in FIG. 6, an LCC converter 600 can include the same DC balance feature (e.g., the bus balance circuit) as in the LLC converter 500 described above with respect to FIG. 5. The LCC converter 600 is substantially similar to the LLC converter 500 (and similar components are referenced with the same reference numbers), except that the LCC 600 differs from the LLC converter 500 in that another capacitor 602 is added in parallel with the primary winding of the transformer (e.g., the first winding 530 of the transformer 514). DC bus balance operations for the LCC converter 600 are substantially the same as in the case with the LLC converter 500 described above with respect to FIG. 5.

As discussed above, a controller is configured to monitor and control operation of a DC-DC power converter, as discussed herein. Using data stored in associated memory, the controller is operable to execute one or more instructions that may result in the manipulation of one or more switches' conductive states. In some examples, the controller can include one or more processors or other types of controllers. The controller may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

A DC-DC power converter is provided that can actively correct bus balance issues in a UPS due to an unbalanced load or fault condition. The DC-DC power converter includes a bus balance circuit that makes it possible for the converter to be turned into an inverted buck-boost converter that is capable of transferring energy from one DC bus to another. The bus balance circuit operates by converting a half bridge and resonant inductor into an inverted buck-boost converter to convert energy from one DC bus to another DC bus. As described above, the DC-DC power converter is implemented with an online UPS; however, such a DC-DC power converter can be implemented with any other type of UPS having a split DC bus. Furthermore, such a DC-DC power converter can be implemented for application in a renewable energy-based system to meet the typical need to balance multiple DC buses.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A DC-DC power converter system comprising:
a positive bus interface configured to be coupled to a positive DC bus;
a negative bus interface configured to be coupled to a negative DC bus;
a positive battery interface configured to be coupled to a positive terminal of a battery;
a negative battery interface configured to be coupled to a negative terminal of the battery;
a first converter segment coupled to the positive bus interface and the negative bus interface;
a second converter segment coupled to the positive battery interface and the negative battery interface;
a transformer including a first winding coupled to the first converter segment and a second winding coupled to the second converter segment;
a bus balancer circuit coupled to the transformer; and
a controller coupled to the positive bus interface, the negative bus interface, and the bus balancer, the controller configured to identify an imbalance between a positive voltage level on the positive DC bus and a negative voltage level on the negative DC bus, and in response to identifying the imbalance, operating the bus balancer circuit to selectively short one of the first winding or the second winding of the transformer to convert the first converter segment, the transformer, and the second converter segment into an inverted buck-boost converter configured to transfer energy between the positive bus interface and the negative bus interface.

2. The DC-DC power converter system of claim 1, wherein the first converter segment is a half-bridge converter.

3. The DC-DC power converter system of claim 1, wherein the first converter segment includes a plurality of switches coupled between the positive bus interface and the negative bus interface and a resonant inductor coupled between the plurality of switches and the transformer.

4. The DC-DC power converter system of claim 3, wherein the first winding of the transformer is coupled to the resonant inductor.

5. The DC-DC power converter system of claim 4, wherein the bus balancer circuit is coupled across the first winding.

6. The DC-DC power converter system of claim 4, wherein the bus balancer circuit includes a TRIAC coupled across the first winding, and wherein in operating the bus balancer circuit to convert the first converter segment, the transformer, and the second converter segment into an inverted buck-boost converter, the controller is further configured to operate the TRIAC to short the first winding.

7. The DC-DC power converter system of claim 4, wherein the transformer further includes a center tap located between a first portion of the second winding and a second portion of the second winding, the center tap coupled to the negative battery interface, and wherein the second converter segment includes a first diode coupled between the first portion of the second winding and the positive battery interface, and a second diode coupled between the second portion of the second winding and the positive battery interface.

8. The DC-DC power converter system of claim 4, wherein the bus balancer circuit is coupled across the second winding.

9. The DC-DC power converter system of claim 4, wherein the bus balancer circuit includes a plurality of switches coupled across the second winding, and wherein in operating the bus balancer circuit to convert the first converter segment, the transformer, and the second converter segment into an inverted buck-boost converter, the controller is further configured to operate the plurality of switches in the bus balancer circuit to short the second winding.

10. The DC-DC power converter system of claim 1, wherein the second converter segment includes a push-pull converter.

11. The DC-DC power converter system of claim 10, wherein the transformer further includes a center tap located between a first portion of the second winding and a second portion of the second winding, the center tap coupled to the positive battery interface, and wherein the push-pull converter includes a first switch coupled between the first portion of the second winding and the negative battery interface and a second switch coupled between the second portion of the second winding and the negative battery interface.

12. The DC-DC power converter system of claim 1, wherein the second converter segment includes a full-bridge converter.

13. The DC-DC power converter system of claim 12, wherein the full-bridge converter includes a plurality of switches coupled to the second winding, the positive battery interface, and the negative battery interface.

14. A non-transitory computer-readable medium storing thereon sequences of computer-executable instructions for operating a DC-DC converter system coupled to a positive DC bus and a negative DC bus of a UPS, the DC-DC converter system including a first converter segment coupled to the positive DC bus and the negative DC bus, a second converter segment coupled to a positive battery interface and a negative battery interface, and a transformer including a first winding coupled to the first converter segment and a second winding coupled to the second converter segment, the sequences of computer-executable instructions including instructions that instruct at least one controller to:

identify an imbalance in a positive voltage level of the positive DC bus and a negative voltage level of the negative DC bus;

in response to identifying the imbalance, configure the first converter segment, the transformer, and the second converter segment as an inverted buck-boost converter by selectively shorting one of the first winding and the second winding of the transformer; and operate the inverted buck-boost converter to transfer energy between the positive DC bus and the negative DC bus.

15. The non-transitory computer-readable medium of claim 14, wherein the first converter segment includes a half-bridge converter having a plurality of switches coupled to the positive DC bus and the negative DC bus and a resonant inductor coupled between the plurality of switches and the first winding of the transformer.

16. The non-transitory computer-readable medium of claim 15, wherein the instructions further instruct the at least one controller to short the one of the first winding and the second winding of the transformer by operating a bus balancer circuit to short the first winding.

17. The non-transitory computer-readable medium of claim 16, wherein the instructions further instruct the at least one controller to operate the bus balancer circuit by operating a TRIAC to short the first winding.

18. The non-transitory computer-readable medium of claim 15, wherein the second converter segment includes one of a push-pull converter and a full-bridge converter, and wherein the instructions further instruct the at least one controller to short the one of the first winding and the second winding by operating a bus balancer circuit to short the second winding.

19. The non-transitory computer-readable medium of claim 18, wherein the instructions further instruct the at least one controller to operate the bus balancer circuit by operating a plurality of switches to short the second winding.

20. A DC-DC power converter system comprising:

a positive bus interface configured to be coupled to a positive DC bus;

a negative bus interface configured to be coupled to a negative DC bus;

a positive battery interface configured to be coupled to a positive terminal of a battery;

a negative battery interface configured to be coupled to a negative terminal of the battery;

a first converter segment coupled to the positive bus interface and the negative bus interface;

a second converter segment coupled to the positive battery interface and the negative battery interface;

a transformer including a first winding coupled to the first converter segment and a second winding coupled to the second converter segment; and means for configuring the DC-DC power converter and its resonant inductor as an inverted buck-boost converter by selectively shorting one of the first winding and the second winding of the transformer when a voltage imbalance on the positive bus interface and the negative bus interface is identified and for operating the inverted-buck-boost converter to transfer energy between the positive bus interface and the negative bus interface.

* * * * *